United States Patent Office 3,288,801
Patented Nov. 29, 1966

3,288,801
FLUORESCENT 1,2,3-TRIAZOLE DERIVATIVES OF 3-PHENYL-COUMARIN
Fritz Fleck, Bottmingen, Basel-Land, Hans Balzer, Munchenstein, Basel-Land, and Horst Aebli, Basel, Switzerland, assignors to Sandoz Ltd. (also known as Sandoz A.G.), Basel, Switzerland
No Drawing. Filed June 6, 1963, Ser. No. 285,883
Claims priority, application Switzerland, June 7, 1962, 6,887/62
11 Claims. (Cl. 260—308)

The present invention is concerned with new fluorescent 1,2,3-triazole derivatives of 3-phenyl-coumarin, their preparation, and the use thereof as optical brighteners. The said fluorescent triazole derivatives are colorless or substantially colorless compounds of the formula

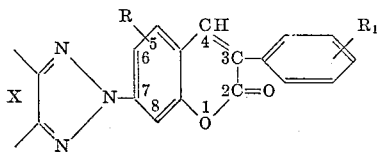

wherein X represents a dihydroaryl radical which may be non-ionogenically substituted and which is connected at two vicinal carbon atoms with the N-atoms of the triazole ring, and each of R and $R_1$ represents H or a non-ionogenic substituent.

The aforesaid new compounds are prepared according to this invention, by diazotizing a primary amine of the formula

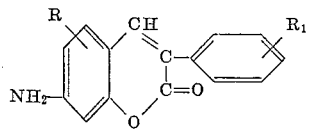

wherein R and $R_1$ have the precedingly-indicated significances, coupling the resultant diazonium salt with a primary aromatic amine which couples vicinal to a primary amino group, and converting the thus-obtained o-aminoazo dye by oxidation into the corresponding 1,2,3-triazole compound.

The new compounds of the invention fluoresce violet to green-blue. They are outstandingly suitable for use as brightening agents.

The substituents R and $R_1$ in the phenyl-coumarin skeleton may be a hydrogen atom, a lower alkyl group with 1 to 5 carbon atoms, such as methyl, ethyl, propyl, etc., an alkoxy group, such as methoxy, ethoxy, etc., a cyano group, a halogen atom, preferably F or Cl, a lower alkylsulfonyl group such as methylsulfonyl, etc., an arylsulfonyl group such as phenylsulfonyl, etc. or a sulfonamide group.

The diazotization of the 7-amino-3-phenyl-coumarin can be carried out in per se conventional manner in aqueous suspension or in concentrated sulfuric acid or in organic aqueous medium, e.g. in aqueous acetic acid, in dimethylformamide or dimethylsulfoxide, by means of an alkali nitrite or an organic nitrite, e.g. amyl nitrite, generally in presence of mineral acid.

The coupling with the coupling component is generally carried out without isolation of the diazonium salt by buffering or neutralizing the acid excess of the diazotization mixture to which the coupling component has been added, e.g. with caustic alkali, sodium carbonate, sodium acetate or tertiary nitrogen bases such as pyridine and homologs thereof, preferably at 20 to 60°.

In the case of components which contain sulfo groups, the latter are simultaneously split off, as are sulfomethyl groups when these are present.

Illustrative of coupling components are for example the following:

aminobenzenes such as—
 1-amino-4-methyl-5-methoxybenzene,
 1-amino-4-chloro-5-methoxybenzene,
 1-amino-4,5-dimethoxybenzene,
 4,4'-diamino-2,2'-dimethoxydiphenyl;
diaminobenzenes such as—
 m-phenylenediamine,
 m-toluylenediamine (2,4-diamino-1-methylbenzene),
 1,3-diamino-4-methoxybenzene,
 1,3-diamino-4-chlorobenzene;
aminonaphthalenes such as—
 2-aminonaphthalene,
 2-amino-5-methoxynaphthalene,
 2-amino-6-methoxynaphthalene,
 2-amino-7-methoxynaphthalene,
 1-amino-4-methylnaphthalene,
 1-amino-4-methoxynaphthalene,
 1-amino-5,8-dichloronaphthalene,
 1-amino-5-methylsulfonylnaphthalene,
 1-amino-naphthalene-5-sulfonic acid-N-dimethylamide, and
sulfonated aminonaphthalenes such as—
 2-aminonaphthalene-1-sulfonic acid,
 naphthyl-2-sulfaminic acid,
 naphthyl-2-methylamino-ω-sulfonic acid.

The latter compounds present the advantage, in comparison to the corresponding sulfo-free compounds, of much reduced physiological danger. The sulfo groups, or sulfomethyl groups, are eliminated in the formation of the dye. Further coupling components which can be used are:

aminoacenaphthenes such as—
 4-aminoacenaphthene,
 5-aminoacenaphthene,
 6-chloro-5-aminoacenaphthene,
 6-methoxy-5-aminoacenaphthene;
aminobenztriazoles such as—
 2-phenyl-5-(6)-aminobenztriazole,
 2-naphthyl-5-(6)-aminobenztriazole,
 2-(p-chlorophenyl)-5-aminobenztriazole,
 2-(p-tolyl)-5-aminobenztriazole,
 2-(p-cyanophenyl)-5-aminobenztriazole,
 2-(p-methoxyphenyl)-5-aminobenztriazole,
 2-phenyl-6-halogen-5-aminobenztriazole,
 2-phenyl-6-alkyl-5-aminobenztriazole,
 2-phenyl-6-alkoxy-5-aminobenztriazole;
aminopyrazoles such as—
 1-phenyl-3-methyl-5-aminopyrazole,
 1-p-chlorophenyl-3-methyl-5-aminopyrazole,
 1-p-tolyl-3-methyl-5-aminopyrazole;
aminoindazoles such as—
 6-aminoindazole,
 5-aminoindazole; etc.

If a polyamine is employed as coupling component, it is preferred to acylate the amino groups which remain after the triazolization of the resultant azo dyestuff or to remove such groups by diazotization followed by boiling, or to replace the diazotized amino groups by non-ionogenic substituents, because free amino groups impair the light-fastness of the brightener.

Because of the water-insolubility thereof, the oxidation of the o-aminoazo dyestuffs is preferably carried out in oxidation-stable organic solvents such for example as dimethylformamide, pyridine, halogenated hydrocarbons such as chlorobenzene, etc.

The following are for example suitable as oxidizing agents:

Alkali hypohalites, especially sodium hypochlorite, cupric salt complexes of inorganic or organic cupric salts such as copper sulfate, copper carbonate, copper acetate, copper naphthenate, etc., and nitrogen bases such as ammonia, amines, pyridine, etc.

The compounds of the present invention are preferably purified by recrystallization from an organic solvent, optionally with addition of active charcoal, or from mixtures of organic solvents with water, optionally with addition of a small quantity of alkali hydrosulfite.

The 7-triazolyl-coumarins are light yellow to brownish yellow powders which are insoluble in water, but are soluble in organic solvents, such as hydrocarbons, alcohols, ketones, esters, as well as in the softeners conventionally used in working up plastics, yielding intense violet-blue to greenish-blue fluorescence.

They are excellently suitable for use as brightening agents for weakly colored organic materials, such as foils, molded articles or fibers of polymeric and polycondensed synthetic materials, such as polyesters, polyamides, polyurethanes, polyacrylonitrile, polyvinyl chloride, polyvinylidene chloride, polyethylene, polypropylene, as well as of copolymers for the said synthetic materials, also of acetate silk, cellulose triacetate, natural polyamides, and finally also for fats, oils, waxes, paraffins, etc.

They can also be used for marking oils such as petroleum oil and distillates thereof.

The triazolylcoumarins of the present invention are especially valuable for the brightening of polyester fibers of the type of polyglycolterephthalate, such as Terylene, Dacron, etc.

7-aminocoumarins have long been known as brightening agents for various substrates. However, 1,2,3-triazole derivatives of 3-phenyl-coumarin, such as are obtained according to the present invention, have not heretofore been known. The reason for this is probably the fact that the coumarin ring has been regarded as, first, not oxidation-stable and, secondly, as readily split with alkali. Under these conditions for the oxidation of an o-aminoazo dyestuff to the 1,2,3-triazole, the expectation was that the coumarin ring would be opened by the alkali present during such oxidation and would be completely destroyed. Unexpectedly however the 3-phenyl-substituted 7-aminocoumarins can be converted into 7-triazolyl-3-phenyl-coumarins in good yield and without noteworthy decomposition.

The replacement of the amino groups in diaminostilbene derivatives by 1,2,3-triazole rings generally brings about a weak displacement of the fluorescence toward the green. The expectation was that in the present case the shade of the fluorescence of e.g. 7-amino-3-phenyl-coumarin, which shows a greenish-blue fluoroscence in alcohol, would be strongly displaced toward the green. Unexpectedly, this does not occur.

On the other hand, the intensity of the fluorescence is surprising, when it is realized that 7-amino-coumarins which are substituted with phenyl groups in the 3-position yield only extremely weakly fluorescent products of no technical value, upon diazotization, coupling and oxidation after the manner of the present invention.

The present 7-triazolyl-3-phenyl-coumarins are distinguished by the neutral blue to greenish-blue fluorescent shade on polyester fibers, while all current commercial brighteners which exert a measurable effect on polyester fibers, give markedly reddish-blue brightening.

The production of neutral blue to greenish-blue brightening on the said fibers, which has not heretofore been possible in satisfactory manner, supplies a distinct need so that the compounds of the present invention represent an enrichment of the art.

The present triazolyl coumarins are stable to oxidizing agents (they are prepared in the presence of such agents) and can therefore be used in chloride bleaching baths. In addition, they have very high light- and wash-fastness properties.

The compounds of this invention can be used alone or in combination with other brighteners, in which connection they can also be used as shade correctors for reddish brighteners.

They may be used from an aqueous bath, advantageously in the presence of dispersing agents or solvents and, on polyester fibers, in the presence of an auxiliary known as a "carrier"; they can also be used in washing baths.

The compounds of the present invention can also be incorporated into synthetic materials or synthetic fibers by melting or dissolution in softeners for the fibers or by incorporation into solutions of the substrates (i.e. in spinning solutions and the like).

In addition, the new brighteners can also be used according to the so-called "Foulardtherm" process, wherein the brightener, uniformly applied to the material to be brightened by cold immersion (foularding) in an aqueous suspension, is fixed by means of a subsequent heat treatment (dry or with steam).

The following examples set forth presently preferred illustrative embodiments of the invention. In these examples, the parts are by weight, and the temperatures are in degrees centigrade.

*Example 1*

28.6 parts of 3-phenyl-7-amino-coumarin hydrochloride (amine content=83%) are diazotized at 15–20° in a mixture of 136 parts of concentrated sulfuric acid and 6.9 parts of sodium nitrite. After a short period of stirring, the reaction is completed. The reaction mixture is then poured onto 390 parts of ice, the resultant suspension of diazo compound stirred until it is homogeneous, whereupon a solution of 22.3 parts of 2-amino-naphthalene-1-sulfonic acid and 4 parts of sodium hydroxide in 150 parts of water is added at 8°, and coupling then effected by warming the mixture to 50–60°. The resultant dyestuff is filtered off, washed with water, then with 1% aqueous ammonia, and again with water.

The still moist dyestuff (124 parts) is dissolved in 800 to 1000 parts of pyridine at 55°. After cooling to 22°, 170 parts of an approximately 17% aqueous solution of sodium hypochlorite is added dropwise to the dyestuff solution in the course of 30 minutes. After stirring the mixture for several hours, the dyestuff will for the most part have disappeared. The mixture is then heated to 95°, after which it is allowed to cool. After further cooling with ice-water, the resultant crystalline precipitate is filtered off, first washed with a mixture of pyridine and water (1:1 by volume), and then with water alone. By treatment with active charcoal and recrystallization from the 10-fold quantity of chlorobenzene, the 3-phenyl-7-naphthotriazolyl-coumarin is purified.

The compound corresponds to the formula

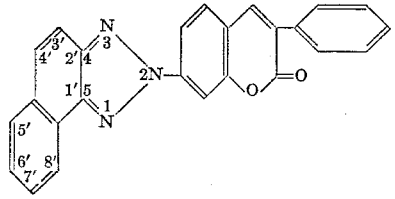

It is insoluble in water, but is soluble in many organic solvents such as dimethylformamide, pyridine, chlorobenzene, ethyleneglycolmonomethylether, dioctylphthalate, etc.

The same compound can be obtained when, in the present example, the 2-amino-naphthalene-1-sulfonic acid is replaced by 14.3 parts of 2-amino-naphthalene or by 22.3 parts of naphthyl-2-sulfaminic acid or by 23.7 parts of 2-naphthylamino-methanesulfonic acid.

Compounds with similar properties are obtained when, in the present example, the 2-amino-naphthalene-1-sulfonic acid is replaced by 17.3 parts of 2-amino-5-methoxy-naphthalene, or by 17.3 parts of 2-amino-7-methoxy-naphthalene or by 17.3 parts of 1-amino-4-methoxynaphthalene, while otherwise proceeding as described in said example.

All the aforesaid products have an intense blue fluorescence in organic solvents in daylight and, used in aqueous dispersion, are valuable optical brighteners for synthetic fibers, more especially for polyester fibers from terephthalic acid and glycol. The said products can be used in chlorite-containing bleaching baths and are distinguished by unexpectedly high light-fastness.

*Example 2*

28.6 parts of 3-phenyl-7-amino-coumarin hydrochloride (amine content=83%) are diazotized, after the manner described in Example 1, whereupon a solution of 13.7 parts of 1-amino-4-methyl-5-methoxybenzene in 100 parts of pyridine is added at 8–10°, and the mixture warmed to 50–60°. The resultant o-amino-azo dyestuff is filtered off and washed neutral.

For oxidation, the still moist dye filter-cake is dissolved in 800 to 1000 parts of pyridine by heating to 75°. At this temperature, 50 parts of copper acetate are added to the dyestuff solution in the course of 30 minutes. After boiling for several hours under reflux, the dyestuff has disappeared. The mixture is cooled and the resultant precipitate is separated, washed with a mixture of pyridine and water (1:1 by volume) and finally again with water alone.

The crude product is purified by treatment with active charcoal and recrystallization from o-dichlorobenzene. The obtained compound corresponds to the formula

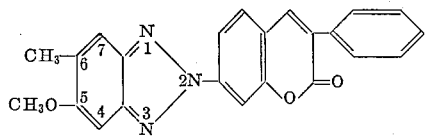

Products with quite similar properties are obtained when, while otherwise proceeding according to the present example, the 1-amino-4-methyl-5-methoxybenzene is replaced by 15.75 parts of 1-amino-4-chloro-5-methoxy benzene or by 15.3 parts of 1-amino -4,5-dimethylbenzene or by 12.2 parts of 4,4'-diamino-2,2'-dimethoxy-diphenyl.

All the thus obtained compounds are valuable brighteners, more especially for polyester fibers from terephthalic acid and glycol.

*Example 3*

28.6 parts of 3-phenyl-7-amino-coumarin hydrochloride (amine content=83%) are diazotized, after the manner described in Example 1. To the diazo suspension there is added, at 8–10°, a solution of 21 parts of 2-phenyl-5(6)-amino-benztriazole in 180 parts of pyridine, and the coupling completed by heating to 50–60°. The so-obtained dyestuff is dissolved in pyridine, after the manner described in Example 1, oxidized with sodium hypochlorite, and the difficultly soluble oxidation product washed with water. By treatment with active charcoal and recrystallization from o-dichlorobenzene, a pale yellow crystalline powder is obtained. It corresponds to the formula

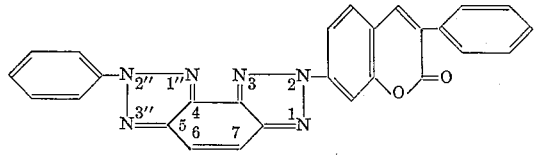

A compound with similar properties is obtained when, while otherwise proceeding according to the present example, the 2-phenyl-5(6)-amino-benztriazole is replaced by 26 parts of 2-naphthyl-5(6)-amino-benztriazole. The compounds are yellowish powders which give an intense blue fluorescence in organic solvents and can be used as brighteners for synthetic fibers.

*Example 4*

A paste consisting of 33.5 parts of 3-phenyl-7-amino-coumarin-hydrogensulfate (amine content=71%) and 51.2 parts of 75% sulfuric acid are thoroughly stirred with 267 parts of water. After the addition of 134 parts of crushed ice, diazotization is forthwith carried out with 6.9 parts of sodium nitrite, dissolved in 20 parts of water. Several hours of stirring are required in order to bring the reaction to completion. Coupling is then effected at 8–10° with a solution of 17.0 parts of 5-amino-acenaphthene in pyridine. By warming to 50–60°, the formation of the dyestuff is completed. The filtered off and washed neutral dyestuff is stirred with 750 parts of chlorobenzene, after which there is added to the resultant mixture at 70° a copper tetramine solution consisting of 60 parts of crystalline copper sulfate, 120 parts of concentrated aqueous ammonia and 100 parts of water, the mixture being boiled under reflux for several hours with vigorous stirring until the dyestuff disappears. The mixture is then cooled to 5°, the resultant precipitate filtered off and washed with 10% hydrochloric acid and with water. The reddish brown product is purified and freed from copper compounds by recrystallization from chlorobenzene. It corresponds to the formula

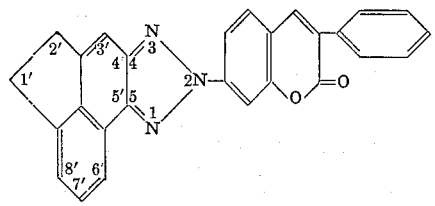

Applied to polyester fibers from terephthalic acid and glycol, the product imparts to the said fibers a brilliant neutral white tone of excellent fastness to light.

*Example 5*

A suspension of diazo compound obtained after the manner described in Example 4 from 33.5 parts of 3-phenyl-7-amino-coumarin hydrogensulfate (amine content=71%) is admixed at 8–10° with 17.3 parts of 1-phenyl-3-methyl-5-aminopyrazole dissolved in glacial acetic acid, and coupling brought to completion by heating to 50–60°. The precipitated dyestuff is separated by filtration and is washed neutral. It is then stirred with 750 parts of chlorobenzene and heated to 75°. At this temperature, a solution of 127.14 parts of copper naphthenate (copper content=10%) in 150 parts of chlorobenzene and 63.2 parts of pyridine is added dropwise in the course of 30 minutes. The mixture is stirred hot until the dyestuff disappears. Insoluble compounds are filtered off, washed with hot chlorobenzene, after which on cooling the new compound is obtained from the filtrate as fine crystals which are purified by treatment with active charcoal and recrystallization from chlorobenzene. The new compound corresponds to the formula

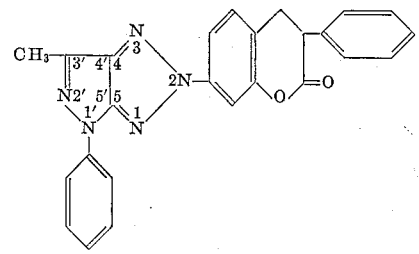

Compounds with quite similar properties are obtained when, in this example, the 1-phenyl-3-methyl-5-amino-pyrazole is replaced by 20.76 parts of 1-(p-chlorophenyl)-3-methyl-5-amino-pyrazole or by 18.7 parts of 1-(p-tolyl)-3-methyl-5-amino-pyrazole, and otherwise proceeding as herein described.

The thus obtained products are chlorite-stable optical brighteners for polyester fibers. They are suitable for brightening the most diverse organic materials, more especially polystyrene, polyethylene and unsaturated polyester resins.

Example 6

23.7 parts of 3-phenyl-7-amino-coumarin are diazotized at 15–20° in a mixture of 140 parts of concentrated sulfuric acid and 6.9 parts of sodium nitrite. The solution is admixed with 390 parts of ice and stirred to form a homogeneous suspension. There is then added, at 8 to 10°, a solution of 13.3 parts of 6-aminoindazole in pyridine, and the whole then heated to 50–60° while stirring. Upon completion of the coupling, the resultant dyestuff is filtered off and washed neutral with water.

The dyestuff is dissolved in chlorobenzene and then oxidized to the 1,2,3-triazol compound with 127.14 parts of copper naphthenate (copper content=10%) and 48.75 parts of monoethanolamine, after the manner of Example 5. The product corresponds to the formula

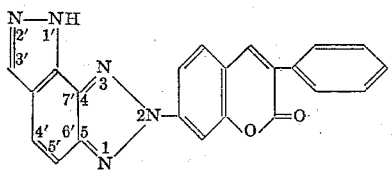

If in the present example the 6-aminodazole is replaced by 13.3 parts of 5-aminoindazole, an end product is obtained which has practically the same properties as that obtained with 6-aminoindazole.

The so-obtained compounds are characterized by properties which make them valuable brightening agents for synthetic polyamide fibers, cellulose ester fibers, or fibers of polyesters from terephthalic acid and glycol.

Example 7

27.15 parts of 3-(p-chlorophenyl)-7-amino-coumarin are diazotized with sodium nitrite in concentrated sulfuric acid, after the manner described in Example 6. The suspension of the diazo compound is admixed, at 10°, with a solution of 22.3 parts of 2-amino-naphthalene-1-sulfonic acid and 4 parts of sodium hydroxide in 150 parts of water, and the ensuing coupling completed by heating to 50–60°.

The resultant o-aminoazo dyestuff is separated by filtration and is washed neutral. A solution of the dyestuff in pyridine is oxidized, after the manner described in Example 1, at 20–22°, with 170 parts of an approximately 17% aqueous solution of sodium hypochlorite. After recrystallization from chlorobenzene, there is obtained a light crystallizate, the alcoholic solution of which has a greenish-blue fluorescence in daylight.

The compound, which corresponds to the formula

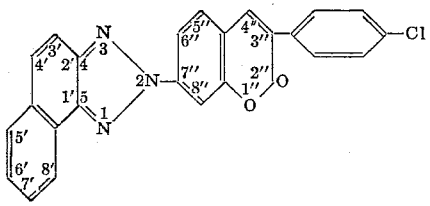

is excellently suited for the brightening of polyester fibers from terephthalic acid and glycol as well as of other synthetic fibers.

Compounds with quite similar compounds are obtained when, in the present example, while otherwise proceeding as described, the 2-amino-naphthalene-1-sulfonic acid is replaced by 15.7 parts of 1-amino-4-methyl-naphthalene, or by 22.1 parts of 1-amino-naphthalene-5-methylsulfone, or 25 parts of 1-amino-naphthalene-5-sulfonic acid-dimethylamide, or by 13.7 parts of 1-amino-4-methyl-5-methoxybenzene.

All the thus-obtained compounds are yellowish powders.

Example 8

12.55 parts of 3-(p-tolyl)-7-amino-coumarin are diazotized at 15–20° in 90 parts of concentrated sulfuric acid and 3.45 parts of sodium nitrite. The reaction mixture is stirred together with 270 parts of ice to form a homogeneous suspension. There is then added, at 8–10°, a solution of 7.15 parts of 2-amino-naphthalene in 50 parts of pyridine, and the ensuing coupling is completed by heating to 50–60°. Neutralization is effected with ammonia, after which 375 parts of technical pyridine are added. If necessary, sodium chloride is added to the mixture until separation into layers takes place. To the so-obtained solution of dyestuff in pyridine, there are added, at 75° and in the course of 30 minutes, 63.57 parts of copper naphthenate (copper content=10%); oxidation to the triazol compound is then completed by boiling for several hours under reflux. After cooling, the crystalline precipitate is filtered off and purified by recrystallization from an aqueous dimethylformamide solution.

In aqueous dispersion, the new compound—which corresponds to the formula

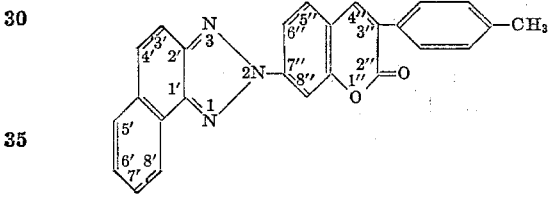

shows a good drawing capacity onto polyester fibers from terephthalic acid and glycol.

The brilliant white tones realized therewith are stable to chlorite and have an unexpectedly high light fastness.

If in the present example, the coupling component is replaced by 6.85 parts of 1-amino-4-methyl-5-methoxybenzene, the resultant compound has a very similar effectiveness.

Example 9

The suspension of the diazo compound obtained according to Example 4 from 33.5 parts of 3-phenyl-7-amino-coumarin-hydrogensulfate (amine content=71%) is combined at 3–5° with a solution of 10.8 parts of 1,3-diaminobenzene in 500 parts of water. Upon completion of the ensuing coupling, the resultant o-aminoazo is filtered off, washed thoroughly and dissolved in 500 parts of warm technical pyridine.

50 parts of copper acetate are added at 75°. The mixture is then stirred at boiling temperature until the dyestuff has completely disappeared. Cooling is then effected to 0°, and the resultant precipitate filtered off and recrystallized from a 1:1 pyridine-water mixture.

17.7 parts of the thus-obtained 5-amino-2-(3′-phenyl-coumarinyl-7′)-1,2,3-benztriazole are dissolved in dimethylformamide and then diazotized at 0–5° with 3.45 parts of sodium nitrite, after the addition of water, ice and 12.5 parts of concentrated sulfuric acid. The mixture is stirred for about an hour, the resultant diazo compound completely precipitated by the addition of sodium chloride and then filtered off.

The still moist diazo compound is added portion-wise to 500 parts of boiling alcohol, and the obtained mixture heated until no diazo reaction is noted. The mixture is allowed to cool, is then filtered and the filter residue dissolved in hot chlorobenzene with addition of active charcoal, followed once more by filtration. On cooling the filtrate, a pale yellow powder crystallizes out which, in solution in alcohol, shows a strong blue fluorescence in daylight. It corresponds to the formula

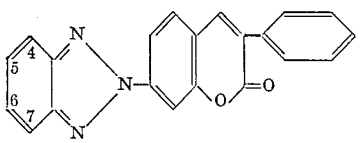

Additional products with like properties are obtained if, in the present example, the 1,3-diaminobenzene is replaced by 12.2 parts of 4-methyl-1,3-diaminobenzene, or by 13.8 parts of 4-methoxy-1,3-diaminobenzene, or by 14.25 parts of 4-chloro-1,3-diaminobenzene, while otherwise proceeding as described.

All the thus-obtained products are valuable brightening agents for organic substrates of the previously mentioned type.

Example 10

34.5 parts of 5-amino-2-(3'-phenyl-coumarinyl-7')-1,2,3-benztriazole (cf. Example 9) are diazotized in concentrated sulfuric acid at 15–20° with 6.9 parts of sodium nitrite. The diazotization mixture is added to a quantity of crushed ice to produce an approximately 25% sulfuric acid. Coupling is then forthwith effected by the addition of 14.3 parts of 2-amino-naphthalene, dissolved in 100 parts of pyridine, the reaction mixture being finally heated to 50–60°.

The so-obtained o-aminoazo dyestuff is filtered off, washed neutral with a large quantity of water and then suspended in 500 parts of pyridine. 0.1 part of a non-ionogenic dispersing agent is advantageously added to the suspension, after which the suspended dyestuff is oxidized by the drop-wise addition of 150–170 parts of an approximately 17% aqueous solution of sodium hypochlorite at 25° in the course of 30 minutes.

The oxidation is brought to completion by heating the mixture to 70 to 80°. The light-brown difficultly-soluble product precipitates, is filtered off, thoroughly washed with water, and then dried. By treatment with active charcoal and by recrystalliation from o-dichlorobenzene, there is obtained a light crystalline powder. It corresponds to the formula

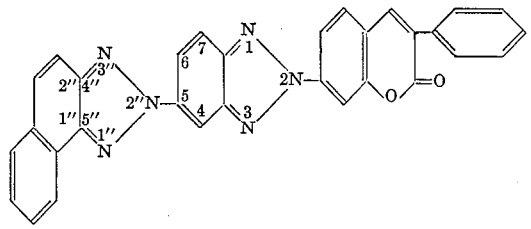

Dissolved in organic solvents, the said product shows a strong blue fluorescence. It is excellently suited for use as a brightener for fibers and structures of polyesters, polyamides, polyacrylonitriles, cellulose esters, polyurethanes, polyolefines, etc.

A similarly acting compound is obtained when, in this example, the 2-amino-naphthalene is replaced by 13.7 parts of 1-amino-4-methyl-5-methoxy-benzene, while otherwise proceeding as described in the example.

Example 11

10 parts of 3-phenyl-7-naphthotriazolyl-coumarin (cf. Example 1) is admixed with 20 parts of sodium dioctyl-phenylpolyglycoletheroxyacetate, having 40 ethenoxy groups in the molecule, and with 70 parts of water, in such manner that a fine dispersion (paste) is obtained.

100 parts of polyester fabric, e.g. Terylene or Diolene, are treated for one hour at 60 to 90° in a bath of the following composition: 3000 parts of water, 6 parts of formic acid (85%), 6 parts of sodium chlorite, and 0.8 part of the precedingly described paste. The so-treated fabric is then rinsed and dried. It then shows a higher whiteness than a comparable fabric which has been treated under otherwise the same conditions except that no triazol derivative has been added.

If in this example the sodium chlorite and the formic acid are replaced by 15 parts of 40% peracetic acid, a similar effect is obtained.

Example 12

50 parts of a mixed fabric of cotton and polyester (Diolene) are treated with 0.4 part of the paste described in Example 11, in a goods-to-liquor ratio of 1:30, for one hour at 60 to 100°. 0.5 part of a non-ionic dispersing agent is advantageously added to the bath. At the end of the treatment, the fabric is rinsed and dried. It appears much brighter and more brilliant than the untreated fabric.

The 3-phenyl-7-naphthotriazolyl-coumarin can, in this example, be replaced by 6-methyl-5-methoxy-2-(3'-phenyl-coumarinyl-7')-1,2,3-benztriazol (cf. Example 2) as the brightener.

Example 13

0.3 part of 3-phenyl-7-naphthotriazolyl-coumarin (cf. Example 1) in solution in 4 parts of dimethylformamide is added to a solution of 150 parts of a polyacrylonitrile powder (Orlon) in 1000 parts of dimethylformamide. Foils and threads made from the resultant solution have a whiter aspect than those made from a like solution without brightener.

Example 14

A fabric of polyester fibers (Terylene, Dacron) is impregnated at room temperature (about 20° to about 30°) on the foulard with a solution which contains, in 1000 parts of water, 0.5 part of the optical brightener according to Example 4 and 1 part of sodium dioctylphenyl-polyglycoletheroxyacetate containing 40 ethenoxy groups. The fabric is expressed down to an 80% by weight liquid uptake, dried for 30 minutes at 60°, and then subjected for 10 minutes to a further heat treatment at 130°. The fabric is thus strongly brightened. The brightening is at least as strong as that obtained by a corresponding treatment of the fabric in the boiling bath.

Example 15

An acetate silk fabric, washed for 30 minutes at 90° with 5 grams per liter of a soap containing 0.2% of 3-phenyl-7-naphthotriazolyl-coumarin, has a whiter appearance than the same fabric treated with the said soap which does not contain the said brightener.

Example 16

100 parts of polyester fabric (Terylene, Diolene) are treated for 30 to 60 minutes at 120° at a dye-to-liquor ratio of 1:30 in a high-temperature-dyeing apparatus, with 0.6 part of a fine dispersion prepared from 10 parts of 3-phenyl-7-naphthotriazolyl-coumarin, 10 parts of oleyl-polyglycolether having 20 ethenoxy groups in the molecule, and 80 parts of water. The rinsed and dried fabric has, in comparison with the untreated fabric, a vivid brightening of neutral tone.

In the absence of the mentioned apparatus, the fabric can be treated for one hour at the boil. A better utilization of the bath is realized, however, if the bath contains 2 to 5 grams per liter of a fiber swelling agent, e.g. one on a trichlorobenzene basis, and the fabric treated therein for about one hour at 90–95°. Following this treatment, the fabric is advantageously soaped (2 grams of neutral synthetic washing agent per liter, goods-to-liquor ratio 1:40) for 10 minutes at 60–70°. After rinsing and drying, the fabric shows a brilliant white toning of excellent light fastness.

Having thus disclosed the invention, what is claimed is:
1. A compound of the formula

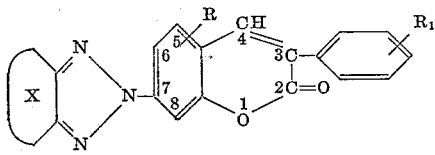

wherein
X is a member selected from the group consisting of benzene, naphthalene, acenaphthene, indazole, benztriazole, pyrazole, non-ionogenically-substituted benzene, non-ionogenically-substituted naphthalene, non-ionogenically-substituted acenaphthene, non-ionogenically-substituted indazole, non-ionogenically-substituted benzene, and non-ionogenically-substituted pyrazole, the non-ionegenic substituents being selected from the group consisting of methoxy, methyl, phenyl, naphthyl, chlorophenyl, tolyl, cyanophenyl, methoxyphenyl, and halogen, X being connected at two vicinal carbon atoms with the N-atoms of the triazole ring,
R is a member selected from the group consisting of hydrogen, lower alkyl, lower alkoxy, cyano, chloro, fluoro, lower alkylsulfonyl, phenylsulfonyl and sulfonamide, and
$R_1$ is a member selected from the group consisting of hydrogen, methyl and chlorine.

2. A compound of the formula

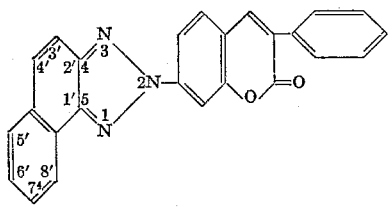

3. A compound of the formula

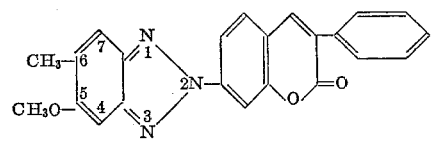

4. A compound of the formula

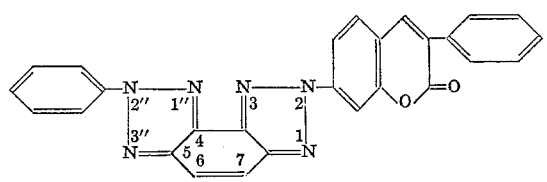

5. A compound of the formula

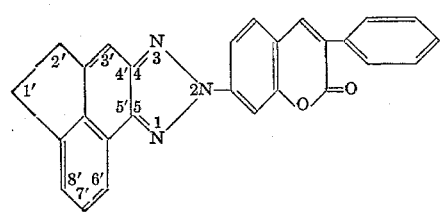

6. A compound of the formula

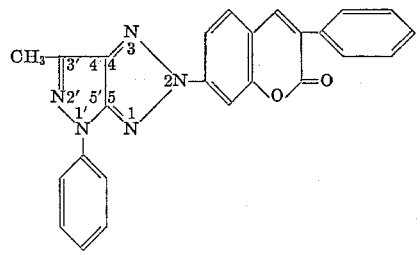

7. A compound of the formula

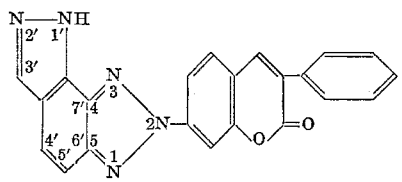

8. A compound of the formula

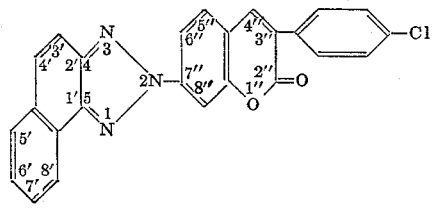

9. A compound of the formula

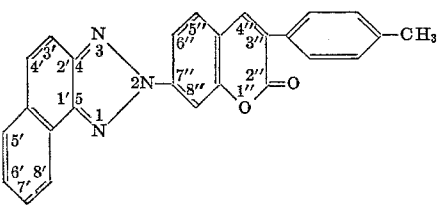

10. A compound of the formula

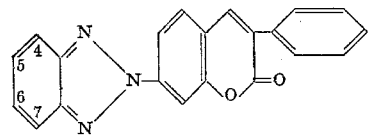

11. A compound of the formula

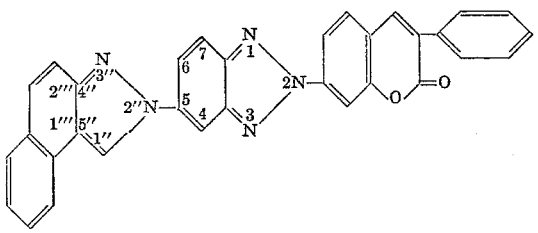

References Cited by the Examiner
UNITED STATES PATENTS

| | | | |
|---|---|---|---|
| 2,334,348 | 11/1943 | Miglarese | 260—308 |
| 2,399,598 | 4/1946 | Kaiser | 260—308 |
| 2,501,649 | 3/1950 | Wright | 260—308 |
| 2,791,564 | 5/1957 | Fleck | 252—301.2 |
| 2,983,686 | 5/1961 | Konig et al. | 252—301.2 |

ALEX MAZEL, *Primary Examiner.*

NICHOLAS S. RIZZO, HENRY R. JILES, *Examiners.*

A. D. ROLLINS, *Assistant Examiner.*